US012386733B2

(12) United States Patent
Chavan et al.

(10) Patent No.: US 12,386,733 B2
(45) Date of Patent: Aug. 12, 2025

(54) SYSTEMS AND METHODS FOR PERFORMING AUTOMATED MONITORING AND TRIAGE OF COMPUTER SYSTEM TESTING

(71) Applicant: T-Mobile Innovations LLC, Overland Park, KS (US)

(72) Inventors: Raju Chavan, Sitwell, KS (US); Aaron Haehn, Olathe, KS (US); Craig Andrew Moir, Lower Hutt (NZ)

(73) Assignee: T-Mobile Innovations LLC, Overland Park, KS (US)

( * ) Notice: Subject to any disclaimer, the term of this patent is extended or adjusted under 35 U.S.C. 154(b) by 72 days.

(21) Appl. No.: 18/303,564

(22) Filed: Apr. 19, 2023

(65) Prior Publication Data

US 2024/0354225 A1    Oct. 24, 2024

(51) Int. Cl.
*G06F 11/00* (2006.01)
*G06F 11/07* (2006.01)
*G06F 11/3698* (2025.01)

(52) U.S. Cl.
CPC ...... *G06F 11/3698* (2025.01); *G06F 11/0721* (2013.01); *G06F 11/0787* (2013.01)

(58) Field of Classification Search
CPC ............ G06F 11/3664; G06F 11/0721; G06F 11/0787
See application file for complete search history.

(56) References Cited

U.S. PATENT DOCUMENTS 11,573,888 B2 *    2/2023    Sharma ................. G06F 40/117

\* cited by examiner

*Primary Examiner* — Amine Riad

(57) ABSTRACT

A method for testing a computer system. The method includes executing a test batch including a plurality of separate test cases, generating a plurality of test logs in response to the execution of the test batch, and identifying automatically a subset of test logs of the plurality of test logs associated with a failed test case of the plurality of test cases prior to the conclusion of the execution of the test batch. The method additionally includes sorting automatically the subset of test logs into a specific arrangement prior to the conclusion of the execution of the test batch, determining automatically a cause of the failure of the failed test case based on the arrangement of the sorted subset of test logs, and aborting the execution of the test batch based on the determination of the cause of the failure of the failed test case.

17 Claims, 8 Drawing Sheets

SYSTEMS AND METHODS FOR PERFORMING AUTOMATED MONITORING AND TRIAGE OF COMPUTER SYSTEM TESTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer systems, including networked computer systems, are tested in a variety of ways for a variety of purposes including to objectively validate that the computer system, including software executed thereon, works as intended in one or more different operating environments. Testing may be functional or non-functional in nature, where functional testing verifies whether the computer system can perform specific actions or functions while non-functional testing focuses on non-functional requirements of the computer system including performance, scalability, and security. Additionally, testing may be automated whereby a number of individual test cases are run sequentially as part of a test batch.

SUMMARY

In an embodiment, a method for testing a computer system is disclosed. The method includes executing by a testing tool of a testing system a test batch comprising a plurality of separate test cases, wherein each test case of the plurality of test cases defines a sequence of processing actions to be executed on the computer system and an expected result, and generating a plurality of test logs by a plurality of components of the computer system in response to the execution of the test batch by the testing tool. The method additionally includes identifying automatically by a testing dashboard of the testing system a subset of test logs of the plurality of test logs associated with a failed test case of the plurality of test cases prior to the conclusion of the execution of the test batch by the testing tool, and sorting automatically by the testing dashboard the subset of test logs into a specific arrangement prior to the conclusion of the execution of the test batch by the testing tool. The method further includes determining automatically by a failure analysis module of the testing dashboard a cause of the failure of the failed test case based on the arrangement of the sorted subset of test logs whereby the failure analysis module determines a failure category of the failed test case, and aborting by the testing dashboard the execution of the test batch based on the determination of the cause of the failure of the failed test case by the failure analysis module.

In an additional embodiment, another method for testing a computer system is disclosed. The method includes executing by a testing tool of a testing system a test batch comprising a plurality of separate test cases, wherein each test case of the plurality of test cases defines a sequence of processing actions to be executed on the computer system and an expected result, and generating a plurality of test logs by a plurality of components of the computer system in response to the execution of the test batch by the testing tool. The method additionally includes identifying automatically by a testing dashboard of the testing system a subset of test logs of the plurality of test logs associated with a failed test case of the plurality of test cases prior to the conclusion of the execution of the test batch by the testing tool, constructing automatically by the testing dashboard a sequential timeline arranging the subset of test logs into a temporally ordered sequence prior to the conclusion of the execution of the test batch by the testing tool, and determining automatically by a failure analysis module of the testing dashboard a cause of the failure of the failed test case based on the timeline arranging the subset of test logs.

In a further embodiment, another method for testing a computer system is disclosed. The method includes executing by a testing tool of a testing system a test batch comprising a plurality of separate test cases, wherein each test case of the plurality of test cases defines a sequence of processing actions to be executed on the computer system and an expected result, and generating a plurality of test logs by a plurality of components of the computer system in response to the execution of the test batch by the testing tool. The method additionally includes identifying automatically by a testing dashboard of the testing system a subset of test logs of the plurality of test logs associated with a failed test case of the plurality of test cases prior to the conclusion of the execution of the test batch by the testing tool, sorting automatically by the testing dashboard the subset of test logs into a specific arrangement prior to the conclusion of the execution of the test batch by the testing tool, and determining automatically by a failure analysis module of the testing dashboard a cause of the failure of the failed test case based on the arrangement of the sorted subset of test logs whereby the failure analysis module determines a failure category of the failed test case.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
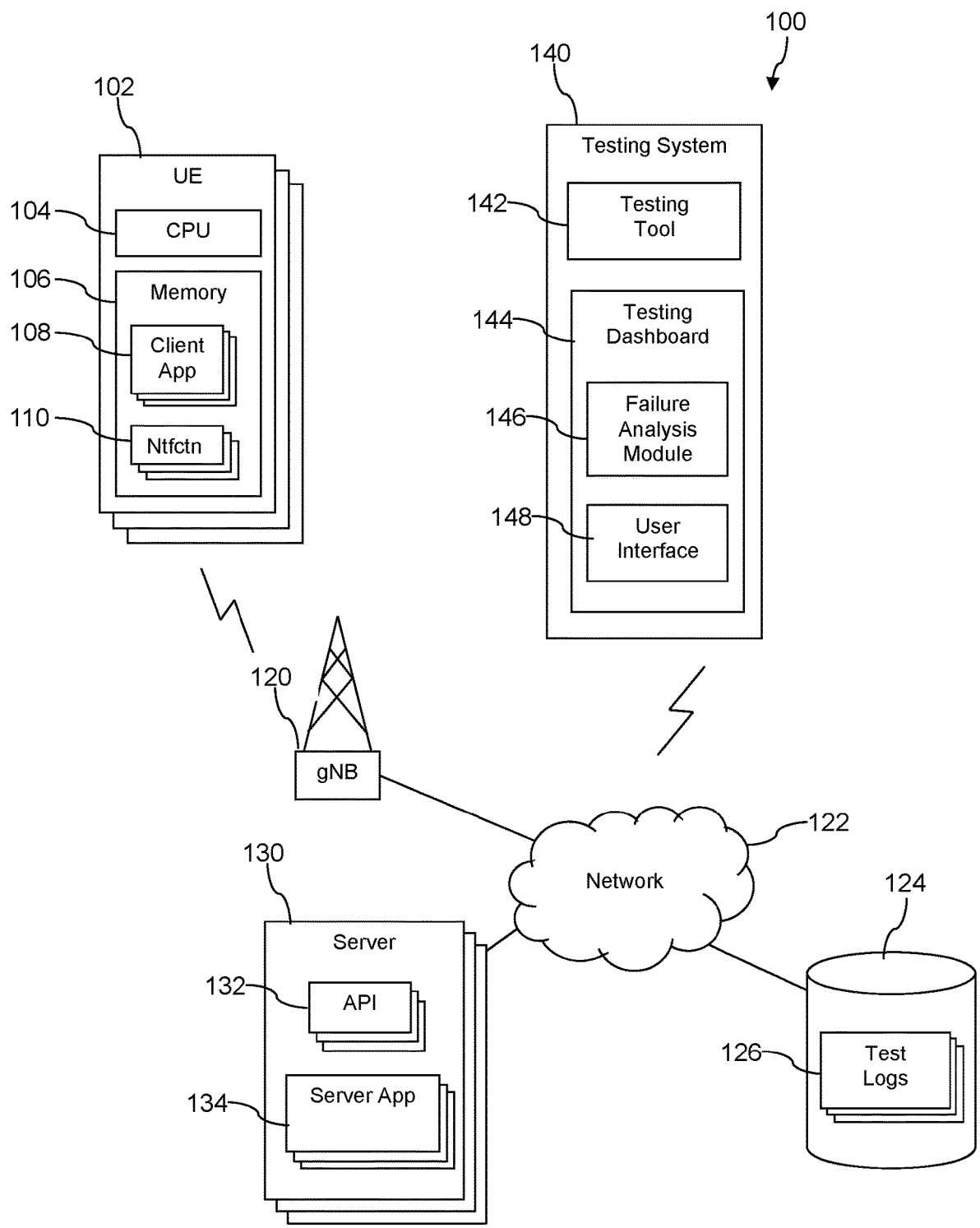
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, the term "computer system" refers to both individual computer systems and networked computer systems which may collectively define a communication system. As described above, computer systems, including software executed thereon, may be subject to both functional and non-functional testing where functional testing verifies whether specific functions of the computer system adhere to predefined specifications (e.g., does a particular feature work or can a user perform a particular action?) while non-functional testing tests aspects of the computer system which are not directly related to a specific function or user action such as the performance, usability, testability, scalability, and security of the computer system.

Testing of the computer system may be conducted at different points of the lifespan of the computer system including initially when the intended requirements of the computer system are defined, when the architecture of the computer system is defined, when the computer system is constructed, and following the activation of the computer system whereby users are permitted to access one or more features or services offered by the computer system. Testing of the computer system may be conducted when a new release of the computer system or a new release of software are deployed. Following activation of the computer system, the system may be subject to testing intended to test the functionality and/or performance of the computer system (e.g., a software application executed on the computer system) under a live setting or product-like circumstances intended to replicate the live setting. The testing of computer systems may be performed using one or more test cases each of which generally define an input and an expected result based on the given input. Particularly, test cases utilized for testing the computer system may include several components including a unique test identifier, a stated objective, a description including a series or sequence of actions to be performed on the computer system, an expected result based on the description of the test case, and the actual result of the test case.

As described above, functional testing focuses on whether one or more specific functions of the computer system adhere to predefined specifications or requirements specific to the function being tested, including functional and business requirements. Particularly, functional testing is used to validate the behavior of the one or more functions subjected to testing, and focuses on the requirements of the user of the computer system. For example, functional testing may be used to verify a specific function of a given source code comprising a software application executed on the computer system. Thus, the objective and description of test cases associated with functional testing focus on functional requirements of the one or more functions being tested.

Unlike the functional testing which seeks to verify specific functions or actions of the computer system (e.g., the tested functions perform as intended as defined in the design requirements of the function), non-functional testing verifies that the computer system or component(s) thereof function as intended even in environments in which the system receives unexpected or demanding inputs. As but one example, non-functional testing may verify how many users may concurrently access a given service or feature of the computer system. One specific type of non-functional testing is performance testing which exercises the computer system being tested under a controlled, sanitized environment to thereby test the stability, reliability, speed, response time, scalability (e.g., how many users can simultaneously access a given feature), and resource usage of a given computer system or component(s) thereof under different workloads and in different operating environments. In this manner, performance testing may determine if a given computer system responds quickly upon prompting, the maximum user load the computer system can handle at a given time, and if the computer system is stable under different workloads.

Testing, including functional and nonfunctional testing, of a computer system may be partially automated whereby a large number of individual test cases (e.g. 100 or more test cases in some instances) are executed sequentially on the computer system by a testing tool as part of a test batch. The execution of each test case of a test batch may result in the testing tool engaging or interacting with a plurality of separate components of the computer system in accordance with the description of the given test case. For example, the execution of a test case may result in the testing tool engaging one or more software applications hosted by an individual server of the computer system to ensure the one or more software applications function or perform as intended in accordance with the expected result of the given test case. As another example, the execution of a test case may result in the testing tool engaging one or more different servers and/or other computing devices of the computer system, one or more data stores of the computer system and the like. Given that test cases of a particular test batch are executed sequentially, the failure (e.g., a hardware failure) of a first test case of the test batch may trigger or result in the failure of subsequent test cases of the test batch that are executed following the execution of the first test case. Indeed, in some instances, the failure of a first test case of the test batch may result in the failure of each of the subsequent test cases of the test batch executed following the execution of the first test case. In some cases, failure of an environment resource, such as an email server, may be the root cause of the first failed test case and may cause many subsequent test cases to fail needlessly, wasting valuable testing time and computing resources.

The components of the computer system engaged by the testing tool as part of the execution of a test case may generate test logs documenting the actions performed on the component as part of the execution of the test case and in accordance with the description of the test case. The test logs generated by components engaged by the testing tool may be stored in a data store of the computer system accessible by a tester or operator of the testing tool via a user interface of the testing tool at the conclusion of the execution of the test case. Given that an individual test case may engage with several different components of the computer system during its execution, a very large number of test logs may be generated by the computer system during the execution of a test batch comprising a plurality of separate test cases.

Conventionally, each test case of a given test batch is executed to completion before the tester operating the testing tool analyzes the results of the test batch. Typically, in conventional practice, the tester accesses the test logs generated by the components engaged by the testing tool at the conclusion of the execution of the test batch in order to analyze the results of the test batch. Particularly, the tester may manually sift through and correlate the test logs of different components of the computer system engaged by the testing tool in order to construct a picture of what actually occurred during the execution of the test batch. For example, the tester may manually correlate the test logs to reconstruct the sequence of events which occurred during the execution of the test batch that resulted in the failure of a test case of the test batch. By reconstructing the sequence of events which led to a failure of one or more test cases of the test batch the tester may determine a root cause of the failure.

The process of manually sifting through a large number of test logs in order to construct a timeline of the events which occurred during the execution of a test batch may require a substantial amount of time and effort on the part of the tester analyzing the test batch. Additionally, as described above, the failure of a first test case of the test batch may result in or trigger the subsequent failure of each test case following the first failed test case. Given that the failure of a first test case of a test batch may result in the failure of subsequent test cases of the test batch executed after the execution of the first test case, the requirement of waiting until the conclusion of the execution of the test batch before analyzing the results of the test batch by the tester may waste system processing time or resources of the computer system (engaged in executing the subsequent test cases following the first test case) which could otherwise be applied to more useful endeavors. In summary, the manual analysis by a tester of the results of a test batch through analyzing the test logs generated in response to the execution of the test batch may be a highly labor-intensive process that reduces the computing efficiency of the computer system being tested.

In an embodiment, systems and methods for testing a computer system accessible by a plurality of users are provided. Particularly, a testing tool of a testing system may execute a test batch whereby a plurality of separate test cases of the test batch are automatically executed sequentially with each test case engaging or interacting with one or more components of the computer system being tested. As the test cases of the test batch are executed by the testing tool, a testing dashboard of the testing system monitors the execution of the test cases in near real-time such as, for example, within fifteen seconds. For example, the testing dashboard may monitor the test results of each individual test case of a test batch at the conclusion of the execution of the given test case. Thus, unlike conventional testing systems which rely on analysis performed manually by a tester only following the execution of every one of the test cases of a given test batch, at least some of the analysis performed by the testing dashboard of the test logs is performed concurrently with the execution of the plurality of test cases defining the test batch. To state in other words, the testing dashboard need not wait until the conclusion of the execution of the test batch, and instead may automatically begin the process of analyzing the results of the test batch prior to the conclusion of the execution of each test case of the test batch.

Indeed, in some embodiments, the testing dashboard may terminate the execution of the test batch by the testing tool prior to the completion of the execution of the test batch based on the analysis performed by the testing dashboard concurrent with the execution of the test batch. To state in other words, by monitoring the execution of the test cases in near real-time, the testing dashboard may abort the execution of a test batch if desired. In this manner, the testing dashboard may save processing or resources of the computer system which would otherwise have been used to execute unnecessary test cases of the test batch such as, for example, test cases doomed to fail following the failure of an earlier executed test case of the test batch.

In an embodiment, the testing dashboard may analyze the test logs generated by the components of the computer system engaged by the testing tool as part of executing the test cases of the test batch. Particularly, if the result of a given test case is failed, the testing dashboard may capture all of the test logs of the different components of the computer system associated with the failed test case. For example, the testing dashboard may capture all of the test logs having a test identifier matching the test identifier of the failed test case. Given that the test logs may be stored on the computer system that is temporally out of order (e.g., a first event captured in a first test log that occurred before a second event captured in a second test log may be captured or stored on the computer system following the second test log), the process of capturing the test logs associated with the failed test case by the testing dashboard may include logging the test logs and automatically (rather than manually) constructing a timeline of the disparate test logs associated with the failed test case.

In an embodiment, the testing dashboard includes a failure analysis module configured to determine a cause of the failure of a failed test case based on the timeline of events constructed by the testing dashboard from the captured test logs associated with the failed test case. Particularly, the failure analysis module may identify a failure category of a root cause of the failed test case, where the failure categories may include a hardware failure associated with specific hardware of the computer system, a software associated with specific software code executed on the computer system, a data failure associated with specific data utilized by software code executed on the computer system, a failure associated with the operating environment, and a failure associated with a code fix or repair. In addition, the failure analysis module may identify one or more components of the computer system associated with or responsible for the failure of the failed test case. For example, the failure analysis module may identify the component of the computer system where the failure of the failed test case occurred.

In an embodiment, the failure analysis module may be updatable in light of the past performance of the failure analysis module to improve the accuracy of the failure analysis module in properly categorizing the failure of a given failed test case and/or in identifying the component associated with the failure. In some embodiments, the failure analysis module may utilize machine learning (ML) or artificial intelligence (AI) in maximizing the accuracy of the failure analysis module in analyzing the failure of a failed test case. For example, the failure analysis module may comprise a ML algorithm trained on specific training data prior to analyzing the failure of a failed test case. However, it may be understood that in at least some embodiments the failure analysis module may not rely on ML or AI.

The automated analysis provided by embodiments of the testing dashboard described herein may be contrasted with conventional manual testing analysis processes in which a tester manually opens multiple test logs (one test log for each different component engaged by the testing tool) following the conclusion of an execution of a test batch, and sort through the opened test logs to identify test logs associated with the failed test case which may in some instances be interleaved by timestamp as the processing by a given component of the computer system (engaged by the testing tool) may involve parallel processing of different test cases. In addition to manually opening multiple test logs and sorting through the opened test logs, the tester may also be required to manually associate the sorted test logs opened across different user displays of the tester. This manual analysis process is tedious and time consuming for the tester while also being prone to error given its manual nature. Conversely, embodiments of the testing dashboard described herein automates much if not all of the analysis previously performed manually by the tester while also providing the tester with useful tools for assisting with the tester's own analysis or to confirm the analysis performed by the testing dashboard. As but one example, the testing dashboard may automatically generate a flowchart representing the processing flow associated with a failed test case that overlays relevant test logs at appropriate positions along the flowchart to thereby assist the tester in understanding the failed test case.

Turning to FIG. 1, a communication system 100 is described. As previously described, it may be understood that communication system 100 comprises a computer system, such as a networked computer system. In an embodiment, the communication system 100 generally includes an electronic device (user equipment—UE) 102, an access node 120, a network 122, a data store 124, one or more servers 130, and a testing system 140. The UE 102 may comprise, for example, a desktop computer, a workstation, a laptop computer, a tablet computer, a smartphone, a wearable computer, an internet of things (IoT) device, and/or a notebook computer. UE 102 may be operated by a user or customer of the network 122 such as an enterprise, organization, or individual.

The access node 120 of communication system 100 may provide communication coupling the UE 102 to the network 122 according to a 5G protocol, for example 5G, 5G New Radio, or 5G LTE radio communication protocols. The access node 120 may provide communication coupling the UE 102 to the network 122 according to a long term evolution (LTE), a code division multiple access (CDMA), and/or a global system for mobile communication (GSM) radio communication protocol. The access node 120 may be referred to for some contexts as a gigabit Node B (gNB), an enhanced Node B (eNB), a cell site, or a cell tower. Additionally, while not shown, UE 102 may be communicatively coupled to the network 122 via a WiFi access point or another non-cellular radio device. Further, while a single access node 120 is illustrated in FIG. 1, it is understood that communication system 100 may comprise any number of access nodes 120.

The network 122 of communication system 100 may comprise one or more public networks, one or more private networks, or a combination thereof. For example, network 122 may comprise a 5G core network. Further details of 5G networks are discussed below with reference to FIGS. 6A, 6B. While shown as communicatively coupled to the network 122, data store 124, servers 130, and testing system 140 may be considered part of network 122 and are illustrated as separate from network 122 in FIG. 1 to promote discussing their roles with respect to UE 102, as will be discussed further herein. Additionally, although in FIG. 1 network 122 is shown as including only a single data store 124 and servers 130, it may be understood that network 122 may include varying numbers of data stores and servers.

The UE 102 includes a processor or CPU 104 and a memory 106 in signal communication with the processor 104. Additionally, UE 102 includes one or more client applications 108 stored in the memory 106 and executable by the processor 104. Additionally, the execution of client applications 108 by a user of UE 102 may generate one or more notifications 110 based on the actions of the user and associated with the client applications 108.

UE 102 may access various resources of network 122 through the access node 120. For example, a user of UE 102 may transmit information from UE 102 to the network 122 through the access node 120 and save the transmitted information on the network 122, such as on data store 124. As will be described further herein, data store 124 may capture or store one or more test logs 126 generated by one or more components of the communication system 100 (e.g., by UE 102, servers 130) during the execution of a test batch comprising a plurality of individual test cases.

In addition, UE 102 may particularly access resources of the servers 130, where servers 130 may each include one or more application programming interfaces (APIs) 132 and one or more server applications 134. Server applications 134 may provide one or more services or features accessible by the user through the UE 102. For example, UE 102 may access server applications 134 by making one or more calls to the APIs 132 of servers 130. The accessing of the one or more server applications 134 by the UE 102 through APIs 132 may trigger the generation of one or more notifications 110 by the client applications 108 of UE 102.

Testing system 140 of communication system 100 may access various resources and components of communication system 100 such as, for example, UE 102, data store 124, and servers 130 via the network 122. Testing system 140 of communication system 100 is generally configured to test the communication system 100 and components thereof and automatically analyze the results of the testing so as to streamline and expedite the process of analyzing the test results compared with conventional analysis processes reliant on manual analysis of the test results. As but one example, testing system 140 may conduct tests of the server applications 134 of servers 130 and/or the client applications 108 of UE 102, as well as other features of the communication system 100. At least some of the testing conducted by testing system 140 may be automated by the testing system 140. Additionally, at least some of the testing conducted by testing system 140 may be in response to manual intervention by a testing operator. For example, testing operators or testers of the communication system 100 may access the testing system 140 to initiate one or more tests of the communication system 100. Additionally, in some embodiments, personnel other than the testers of communication system 100 may access the testing system 140 such as, for example, developers of software executable on the communication system 100, such as developers of the client applications 108 of UE 102 and/or the server applications 134 of servers 130.

In this exemplary embodiment, testing system 140 generally includes a testing tool 142 and a testing dashboard 144. It may be understood that in other embodiments the configuration of testing system 140 may vary. For instance, in some embodiments, testing system 140 may include features in addition to the testing tool 142 and testing dashboard 144 shown in FIG. 1. Additionally, it may be understood that the components of testing system 140 may not be located on the same server or computing device, and instead may be distributed across a plurality of computing devices having access to the network 122.

The testing tool 142 of testing system 140 is generally configured to execute a plurality of individual test cases of the communication system 100 that comprise or define a test batch of the communication system 100. The test cases executed by the testing tool 142 may be functional or nonfunctional (e.g., performance) in nature. As an example, the testing tool 142 may assist (e.g., in collaboration with a tester of testing system 140) in formulating the plurality of test cases comprising the test batch. Additionally, testing tool 142 may execute at least some of the sequence of actions corresponding to a given test case of the plurality of test cases, such as the sequence of actions prescribed by the description of the given test case. The testing tool 142 may also assist (e.g., in collaboration with a tester of testing system 140) in defining one or more expected results for each test case of the plurality of test cases. Further, the testing tool 142 may compare the expected result defined by a given test case with an actual result obtained from performing the given test case. In this manner, testing tool 142 may assist with comparing the expected result with the actual result of the given test case to evaluate how the communication system 100 performed with respect to the objective of the given test case.

In executing the plurality of test cases, the testing tool 142 may interact with or engage one or more components of the communication system 100 including, for example, components of the UE 102, data store 124, and servers 130. As an example, the execution of a test case by the testing tool 142 may involve executing one or more server applications 134 on one of the servers 130 in order to test the functionality or performance of the one or more server applications 134. As another example, the execution of a test case by the testing tool 142 may involve testing the interaction between different components of communication system 100 such as an interaction between the UE 102 and servers 130 facilitated by APIs 132. Each component of communication system 100 engaged or tested by the testing tool 142 as part of the execution of a test case of a test batch may generate a test log 126 that is captured or stored in the data store 124 of communication system 100. Particularly, the tested components may each generate a test log 126 irrespective of whether the given test case is determined to be a pass or a fail by the testing tool 142. The test logs 126 may each include a unique test identifier linking the test log 126 to a given test case executed by the testing tool 142, as well as other information such as, for example, a listing of one or more processing actions performed by the tested component as part of executing the given test case and a timestamp associated with the processing actions or with the test log 126 itself.

In conventional practice, the test logs 126 stored in data store 124 may define the data repository which must be manually sifted through and organized by a tester operating the testing tool 142 as part of a laborious, inefficient, and time-consuming manual test analysis process. In lieu of this time-consuming and inefficient manual test analysis process, the testing dashboard 144 of testing system 140 is generally configured to automatically monitor and analyze the execution of the test batch by testing tool 142 as the test batch is actively being executed by the testing tool 142. In other words, testing dashboard 144 is configured to begin analyzing the execution of the test batch by the testing tool 142 prior to the conclusion of the execution of the test batch. In some embodiments, the testing dashboard 144 may begin analyzing the test batch prior to the execution of at least some of the individual test cases comprising the test batch. Indeed, in some embodiments, the testing dashboard 144 may complete the analysis of the test batch prior to the execution of at least some of the individual test cases comprising the test batch whereby the testing dashboard 144 may determine a cause of the failure of a failed test case of the plurality of test cases of the test batch. In at least some instances where the testing dashboard 144 completes the analysis of the test batch prior to the completion of the execution of the test batch, the testing dashboard 144 may abort the execution of the test batch 144 before the completion of the execution of the test batch based on or in view of the completed analysis of the test batch. Additionally, in an embodiment, the testing dashboard 144 may complete the analysis of the test batch and determine the cause of the failure of a failed test case of the test batch in near real-time.

In an embodiment, in analyzing the test batch executed by the testing tool 142, the testing dashboard 144 may identify automatically a subset of the test logs generated by the tested components of communication system 100 associated with a failed test case of the plurality of test cases forming the test batch prior to the conclusion of the execution of the test batch by testing tool 144. For example, the testing dashboard 144 may reference test identifiers of the test logs in order to identify the subset of test logs associated with a failed test case.

In an embodiment, in analyzing the test batch executed by the testing tool 142, the testing dashboard 144 may automatically sort the subset of test logs associated with a failed test case of the test batch into a specific arrangement prior to the conclusion of the execution of the test batch by the testing tool 142. The specific arrangement generated by the testing dashboard 144 may assist the testing system 140 and/or tester operating the testing system 140 in identifying a root cause of the failure of a given failed test case of a test batch. For example, the specific arrangement may specifically order or interleave the test logs associated with the failed case in a manner that maximizes the ease in determining the cause of the failure.

Figure 2:
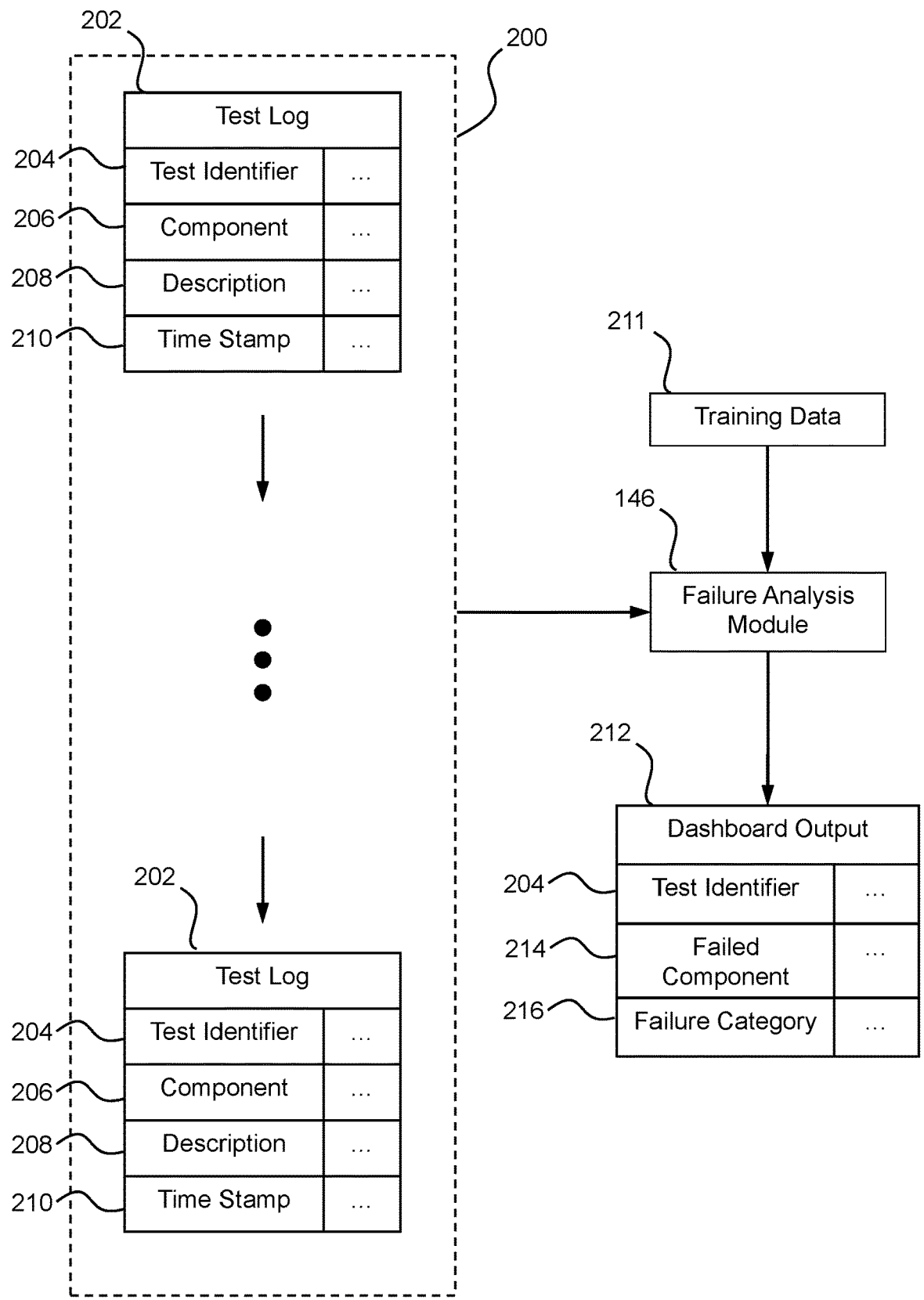
FIG. 2 is a block diagram of a testing timeline according to an embodiment of the disclosure.

As an example, and referring now to FIGS. 1 and 2, an exemplary temporally ordered arrangement or timeline 200 is shown in FIG. 2 that may be generated by the testing dashboard 144. The timeline 200 contains a plurality of test logs 202 which may be similar in configuration to the test logs 126 shown in FIG. 1. In this exemplary embodiment, each test log 202 pertains to a failed test case of a given test batch executed by the testing system 140. Each test log 202 may contain various types of information including, for example, a test identifier 204, a component identifier 206 identifying the component which generated the given test log 202, a description 208, and a time stamp 210 associated with the given test log 202. Test logs 202 may include information in addition to the test identifier 202, component identifier 206, description 208, and time stamp 210 shown in FIG. 2.

The test identifier 204 of each test log 202 of timeline 200 identifies the particular test case of the test batch executed by the testing tool 142. In this exemplary embodiment, each test log 202 contained in the timeline 200 has the same test identifier 204 and thus each test log 202 contained in the timeline 200 corresponds to the same test case. In other words, in constructing timeline 200, testing dashboard 144 is configured to a subset of the test cases of a given test batch associated with the same test case, where the test case may be a failed test case of the test batch. By arranging each of the test logs 202 associated with a specific failed test case of a test batch, the timeline 200 may assist in uncovering the nature or cause of the failure of the failed test case as will be discussed further herein.

The description 208 of each test log 202 of timeline 200 may include the actions or processes executed by the given component 206 which generated the test log 202 as part of executing the test case identified by the test identifier 204 of the test log 202. The description 208 may comprise a portion of the description of the given test case that is specific to or associated with the given component 206 which generated the test log 202. Additionally, the description 208 may identify or describe any errors or failures that occurred during the execution of the test case identified by test identifier 204 by the component 206 which generated the test log 202.

The time stamp 210 of each test log 202 of timeline 200 may be utilized to temporally order the test logs 202 contained in the timeline 200. In some embodiments, the time stamp 210 of each test log 202 may relate generally to the given test log 202, such as by identifying the point in time at which the test log 202 was generated by the component 206. In some embodiments, the time stamp 210 of each test log 202 may be associated with a particular action or event contained in the description 208 of the test log 202. As an example, the time stamp 210 may identify the point in time at which a particular event occurred, such as an error or failure of the component 206 during the execution of the test case identified by the test identifier 204.

While FIG. 2 illustrates timeline 200 as incorporating the test logs 202, it may be understood that in other embodiments the timeline 200 may incorporate only information gathered from the test logs 202 rather than the test logs 202 themselves. For example, timeline 200 may include only the description 208 (or a portion thereof) of each of the test logs 202 associated with a specific test identifier 202 along with any related and pertinent information such as the identity of the component 206. It may also be understood that timeline 200 is but one type of specific arrangement of test logs 202 (or information gathered from test logs 202) which may be generated by the testing dashboard 144 to assist in analyzing a given test batch.

In this exemplary embodiment, testing dashboard 144 includes a failure analysis module 146 and a user interface 148. A tester or operator of testing system 140 may access the testing dashboard 144 via the user interface 148. As an example, an operator of testing system 140 may analyze a specific arrangement of testing data generated by the testing dashboard 144 such as, for example, the timeline 200 shown in FIG. 2 to assist in the operator's analysis of a test batch executed by the testing tool 142 and analyzed by the testing dashboard 144. The user interface 148 may comprise a visual display and one or more input devices to allow the operator to interface with the testing dashboard 144.

The failure analysis module 146 of the testing dashboard 144 is generally configured to determine a cause of the failure of a failed test case of a test batch executed by the testing tool 142. The determination of the cause of the failure of a failed test case by the failure analysis module 146 may be based on the test logs 126 and/or an arrangement of testing data generated by the testing dashboard 144 such as, for example, the timeline 200 illustrated in FIG. 2. In some embodiments, the failure analysis module 146 determines a failure category of the failed test case where specific failure categories include a hardware failure of at least one of the plurality of components engaged by the testing tool 142 in executing the test batch, a software failure associated with software executed by at least one of the plurality of components, a data error associated with data processed by at least one of the plurality of components, a failure associated with the operating environment, and a failure associated with a code fix or repair.

In an embodiment, prior to the failure analysis module 146 determining a cause of failure of a given failed test case, the failure analysis module 146 of testing dashboard 144 may comprise a ML or AI algorithm trained using specific training data 211 as illustrated in FIG. 2. The training data 211 may comprise previously executed test batches in which the failure of any failed test cases of the test batch is already known and used to test and train the failure analysis module 146. By training the failure analysis module 146 using specific training data 211, the accuracy of the failure analysis module 146 in identifying the cause of failure of any failed test cases of a test batch executed by the testing tool 142 may be maximized while errors associated with the analysis of failure analysis module 146 may concomitantly be minimized.

In an embodiment, the failure analysis module 146 of testing dashboard 144 is configured to generate a dashboard output 212 (illustrated in FIG. 2) based on the information analyzed by the failure analysis module 146 such as, for example, information contained in the timeline 200 generated by testing dashboard 144. In an embodiment, the dashboard output 212 generated by failure analysis module 146 includes the test identifier 204, an identified failed component 214, and an identified failure category 216. The test identifier 204 identifies the specific test case analyzed by the failure analysis module 146, where the test case is the same as the test case identified in the specific arrangement generated by testing dashboard 144 such as, for example, the test case identified by timeline 200.

The failed component 214 of dashboard output 212 identifies the component of the one or more components engaged by the testing tool 142 in executing the given failed test case at which the failure of the failed test case occurred. For example, a failed test case may result due to a hardware or software issue of a given component engaged by the testing tool 142, where the given component may be identified as the failed component 214 of dashboard output 212. It may be understood that more than one component may be identified as the failed component 214 in instances where more than one component is responsible for the failure of the given failed test case. The failure category 216 of dashboard output 212 identifies the type or category of failure of the failed test case. For example, the failure category 216 may correspond to one of a hardware failure, a software failure, and a data failure as outlined above. It may be understood that the dashboard output 212 may include information in addition to the information of dashboard output 212 illustrated in FIG. 2.

In some embodiments, the testing system 140 or an operator thereof may assign the failure analysis module 146 a performance score associated with the determination of the cause of the failure of a given failed test case or a failed test batch. The performance score may be assigned post-hoc as a means for evaluating the performance and accuracy of the failure analysis module 146 in analyzing the given test batch. The performance score assigned to the failure analysis module 146 may be based on whether the failure analysis module 146 successfully identified the cause of the failure of a failed test case, including whether the failure analysis module 146 correctly categorized the failure type of the failed test case (e.g., a hardware failure, a software failure, a data failure) and the location of the failure (e.g., the identify of the component responsible for the failure). The assigning of the performance score may be performed automatically by the testing dashboard 144 itself following the conclusion of the execution of a test batch by the testing tool 142 and the analysis of the test batch by the testing dashboard 144.

In an embodiment, the failure analysis module 146 may be modified or adapted in view of one or more performance scores assigned to the testing dashboard 144 in an attempt to improve the performance, efficiency, and/or accuracy of the testing dashboard 144 and failure analysis module 146. For example, one or more underlying ML or AI algorithms of the failure analysis module 146 may be modified in view of one or more performance scores assigned to the testing dashboard 144. In an embodiment, the operation of the communication system 100 itself may be modified by the testing dashboard 144 in order to eliminate or at least mitigate the likelihood of repeated failures of the communication system 100 as analyzed by the testing dashboard 144 following the execution of a test batch by the testing tool 142. As an example, by analyzing past failures using the testing dashboard 144 new data may be obtained to address current failures in instances where the past and current failures comprise data failures associated with specific data utilized by software code executed on the computer system. As another example, by analyzing past failures using the testing dashboard 144 the root cause or causes of those past failures may be quickly identified to address current issues with the operational environment with minimal delay in instances where the past and current failures comprise operational environment failures.

Figure 3:
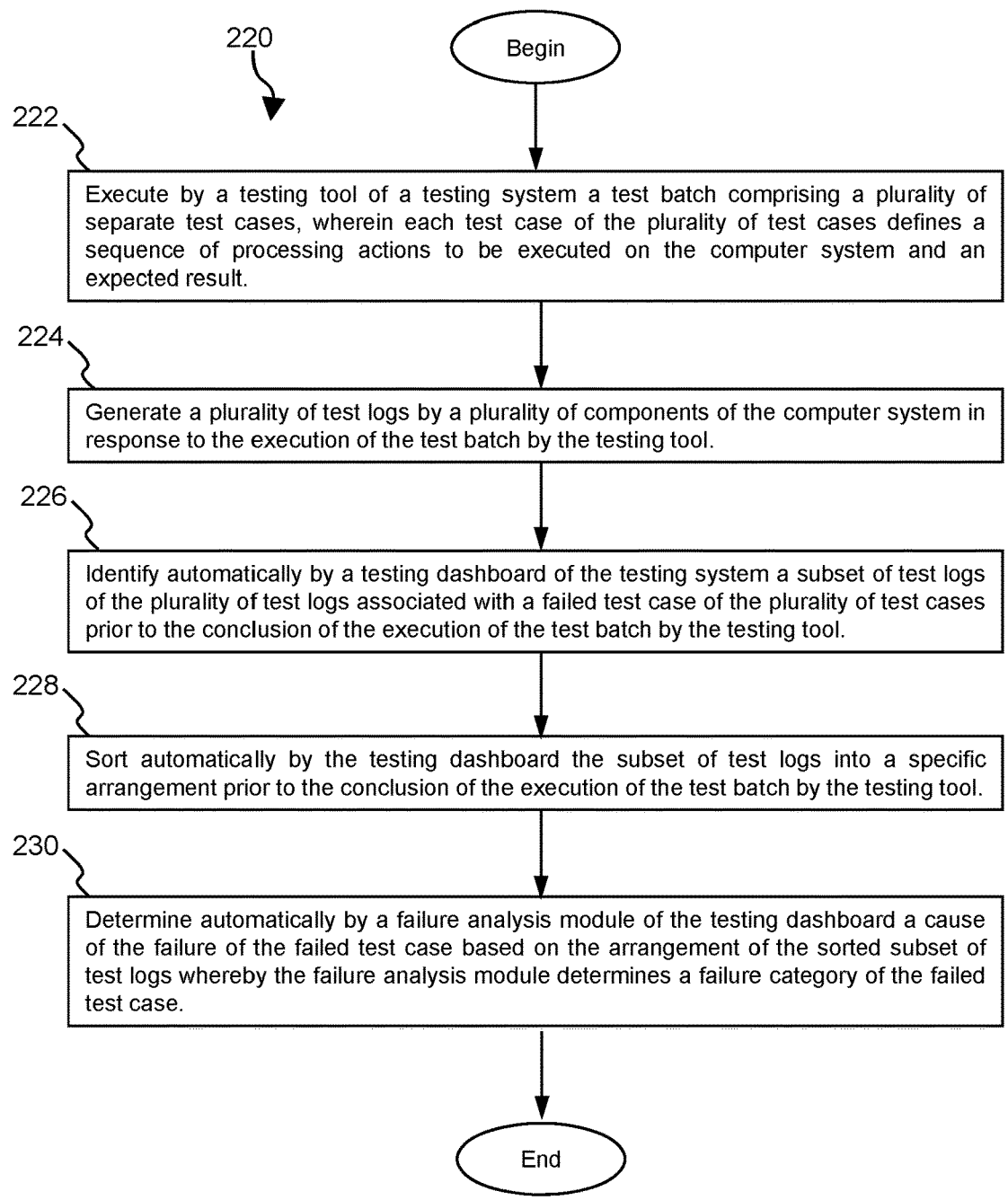
FIG. 3 is a flow chart of a method according to an embodiment of the disclosure.

Turning to FIG. 3, a method 220 is described. In an embodiment, the method 220 is a method for testing a computer system (e.g., the communication system 100 illustrated in FIG. 1 may comprise or define a computer system). At block 222, the method 220 comprises executing by a testing tool of a testing system (e.g., testing tool 142 of the testing system 140 illustrated in FIG. 1) a test batch comprising a plurality of separate test cases, wherein each test case of the plurality of test cases defines a sequence of processing actions to be executed on the computer system and an expected result. At block 224, the method 220 comprises generating a plurality of test logs (e.g., test logs 126 and 202 illustrated in FIGS. 1 and 2, respectively) by a plurality of components (e.g., UE 102, servers 130 illustrated in FIG. 1) of the computer system in response to the execution of the test batch by the testing tool.

Figure 4:
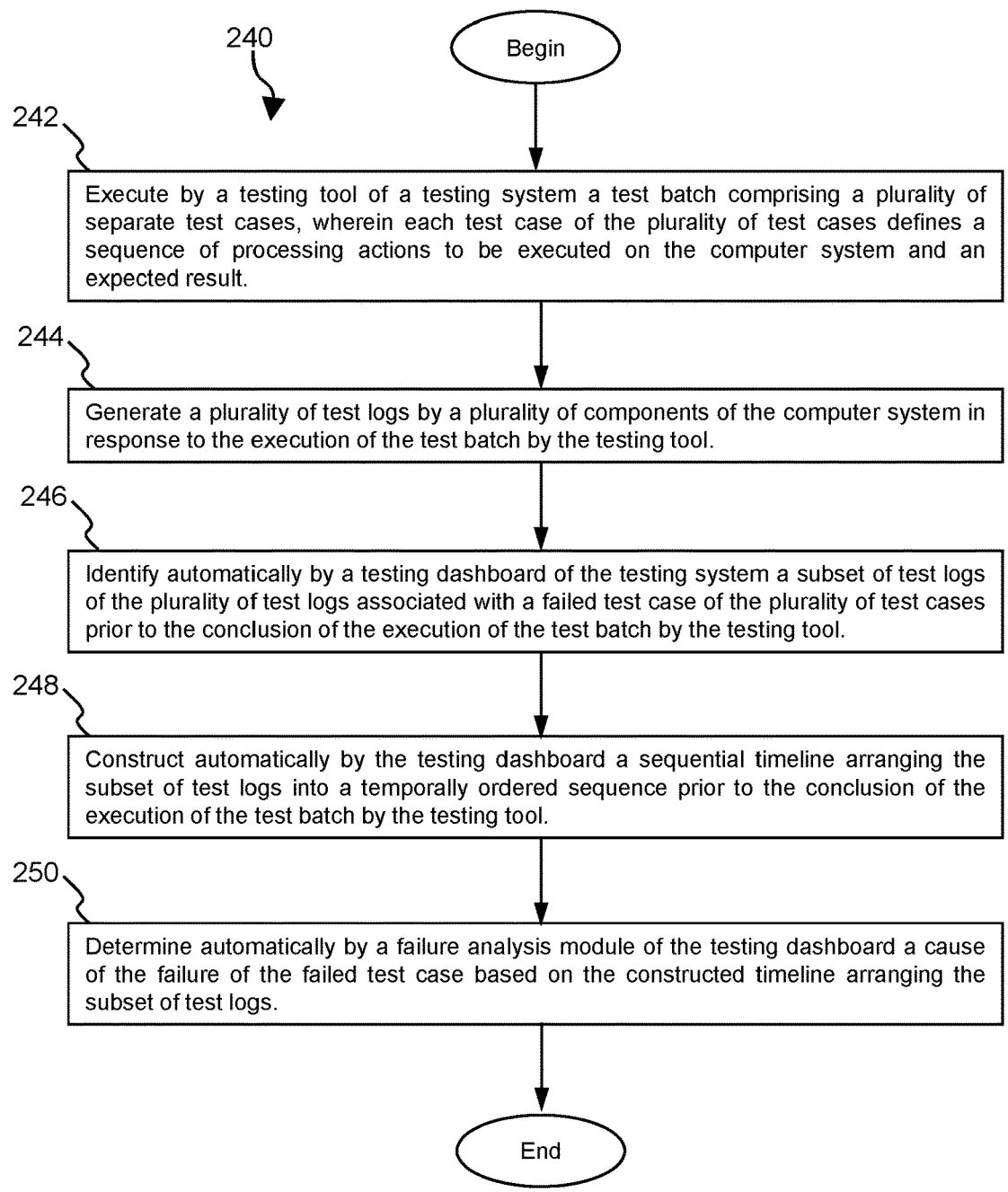
FIG. 4 is a flow chart of another method according to an embodiment of the disclosure.

At block 226, method 220 comprises identifying automatically by a testing dashboard (e.g., testing dashboard 144 illustrated in FIG. 1) of the testing system a subset of test logs of the plurality of test logs associated with a failed test case of the plurality of test cases prior to the conclusion of the execution of the test batch by the testing tool. At block 228, method 220 comprises sorting automatically by the testing dashboard the subset of test logs into a specific arrangement (e.g., timeline 200 illustrated in FIG. 2) prior to the conclusion of the execution of the test batch by the testing tool. At block 230, method 220 comprises determining automatically by a failure analysis module (e.g., failure analysis module 146 of the testing dashboard 144 illustrated in FIG. 1) of the testing dashboard a cause of the failure of the failed test case based on the arrangement of the sorted subset of test logs whereby the failure analysis module determines a failure category of the failed test case Turning to FIG. 4, a method 240 is described. In an embodiment, the method 240 is a method for testing a computer system (e.g., the communication system 100 illustrated in FIG. 1 may comprise or define a computer system). At block 242, the method 240 comprises executing by a testing tool of a testing system (e.g., testing tool 142 of the testing system 140 illustrated in FIG. 1) a test batch comprising a plurality of separate test cases, wherein each test case of the plurality of test cases defines a sequence of processing actions to be executed on the computer system and an expected result. At block 244, the method 240 comprises generating a plurality of test logs (e.g., test logs 126 and 202 illustrated in FIGS. 1 and 2, respectively) by a plurality of components (e.g., UE 102, servers 130 illustrated in FIG. 1) of the computer system in response to the execution of the test batch by the testing tool.

At block 246, method 240 comprises identifying automatically by a testing dashboard (e.g., testing dashboard 144 illustrated in FIG. 1) of the testing system a subset of test logs of the plurality of test logs associated with a failed test case of the plurality of test cases prior to the conclusion of the execution of the test batch by the testing tool. At block 248, method 240 comprises constructing automatically by the testing dashboard a sequential timeline (e.g., timeline 200 illustrated in FIG. 2) arranging the subset of test logs into a temporally ordered sequence prior to the conclusion of the execution of the test batch by the testing tool. At block 250, method 240 comprises determining automatically by a failure analysis module (e.g., failure analysis module 146 of the testing dashboard 144 illustrated in FIG. 1) of the testing dashboard a cause of the failure of the failed test case based on the constructed timeline arranging the subset of test logs.

Figure 5:
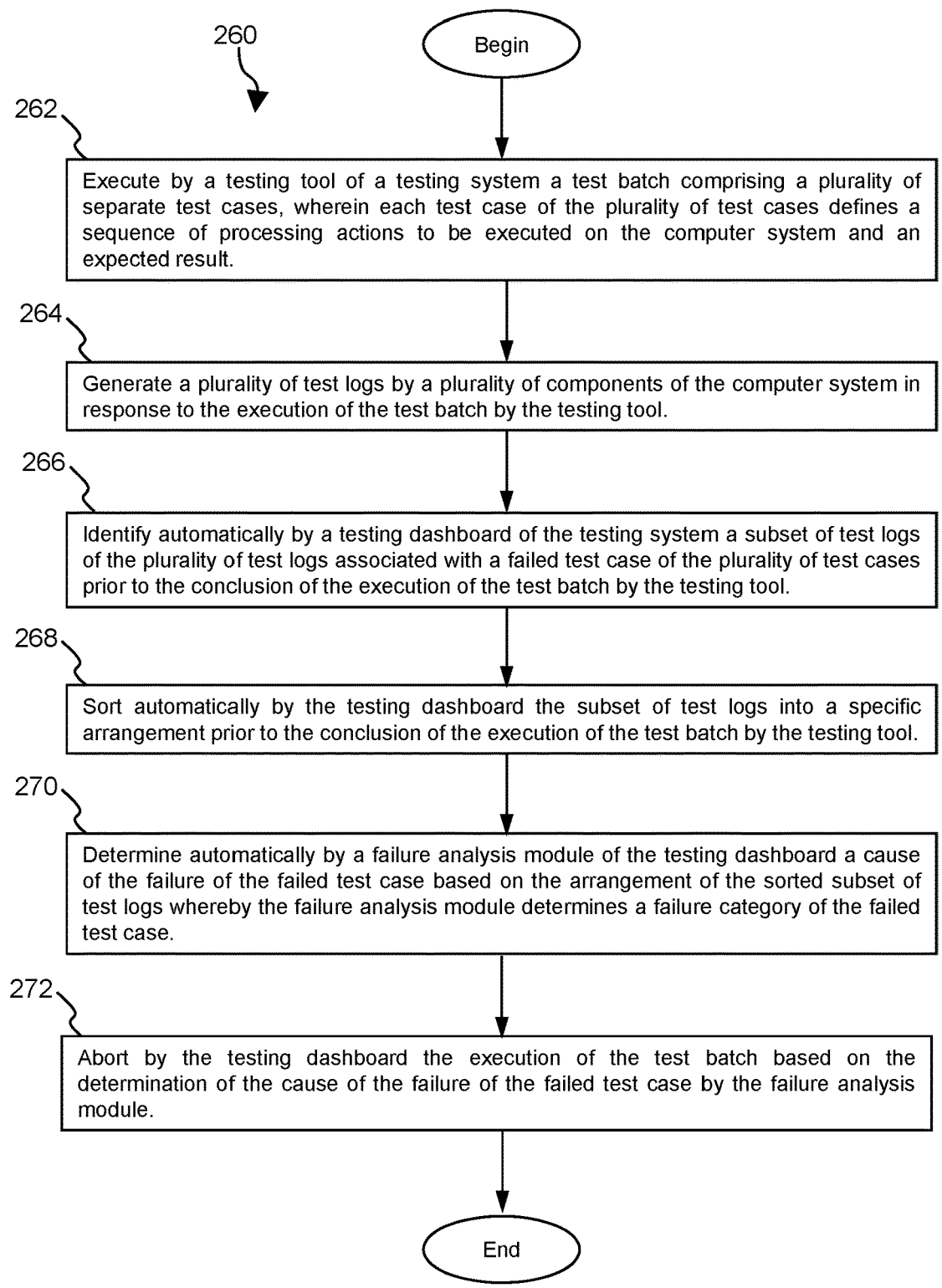
FIG. 5 is a flow chart of another method according to an embodiment of the disclosure.

Turning to FIG. 5, a method 260 is described. In an embodiment, the method 260 is a method for testing a computer system (e.g., the communication system 100 illustrated in FIG. 1 may comprise or define a computer system). At block 262, the method 260 comprises executing by a testing tool of a testing system (e.g., testing tool 142 of the testing system 140 illustrated in FIG. 1) a test batch comprising a plurality of separate test cases, wherein each test case of the plurality of test cases defines a sequence of processing actions to be executed on the computer system and an expected result. At block 264, method 260 comprises generating a plurality of test logs (e.g., test logs 126 and 202 illustrated in FIGS. 1 and 2, respectively) by a plurality of components (e.g., UE 102, servers 130 illustrated in FIG. 1) of the computer system in response to the execution of the test batch by the testing tool.

At block 266, method 260 comprises identifying automatically by a testing dashboard (e.g., testing dashboard 144 illustrated in FIG. 1) of the testing system a subset of test logs of the plurality of test logs associated with a failed test case of the plurality of test cases prior to the conclusion of the execution of the test batch by the testing tool. At block 268, method 260 comprises sorting automatically by the testing dashboard the subset of test logs into a specific arrangement (e.g., timeline 200 illustrated in FIG. 2) prior to the conclusion of the execution of the test batch by the testing tool. At block 270, method 260 comprises determining automatically by a failure analysis module (e.g., failure analysis module 146 of the testing dashboard illustrated in FIG. 1) of the testing dashboard a cause of the failure of the failed test case based on the arrangement of the sorted subset of test logs whereby the failure analysis module determines a failure category of the failed test case. At block 272, method 260 comprises aborting by the testing dashboard the execution of the test batch based on the determination of the cause of the failure of the failed test case by the failure analysis module.

Figure 6A:
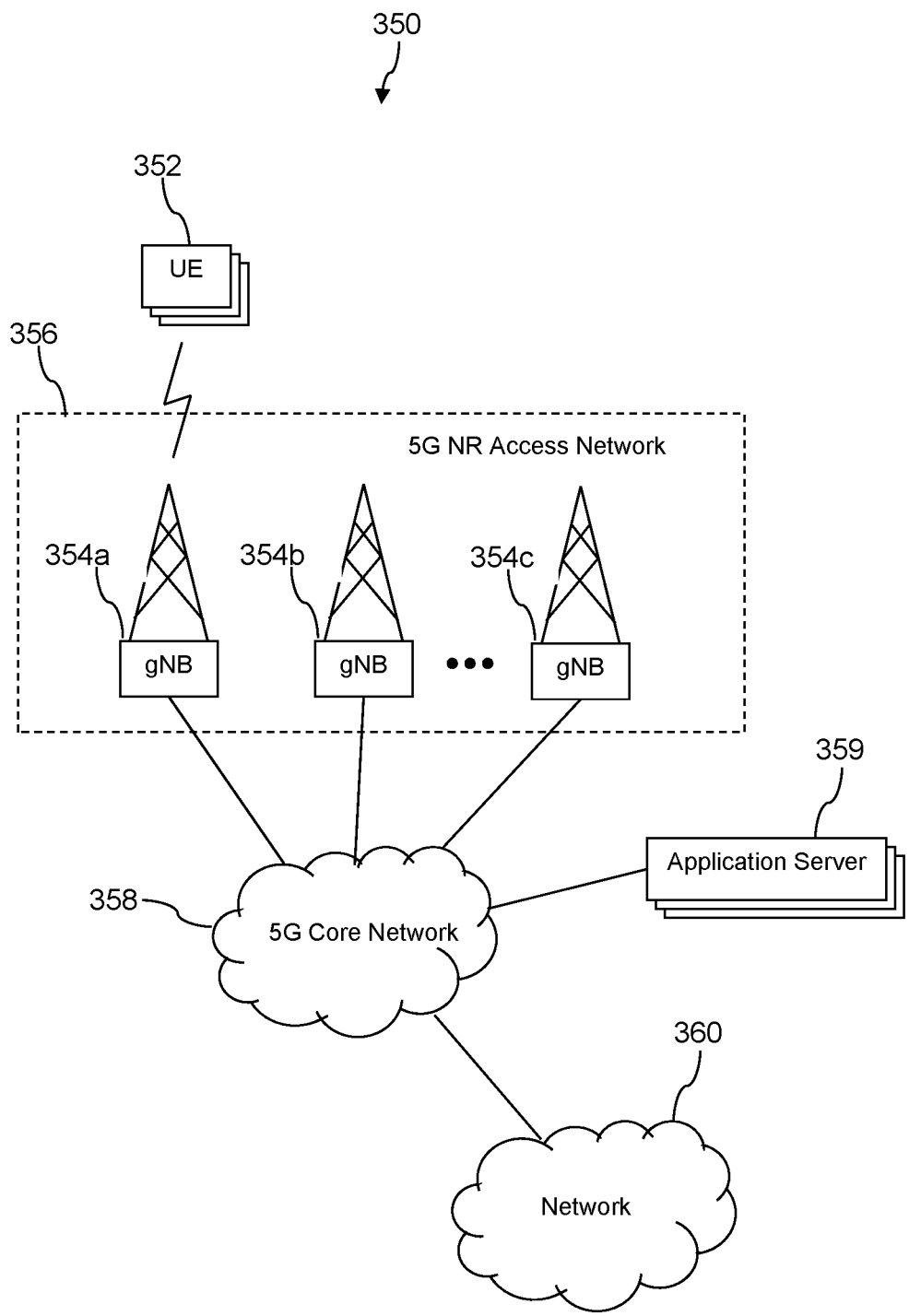
FIG. 6A is a block diagram of another communication system according to an embodiment of the disclosure.

Turning now to FIG. 6A, an exemplary communication system 350 is described. Typically, the communication system 350 includes a number of access nodes 354 that are configured to provide coverage in which UEs 352 such as cell phones, tablet computers, machine-type-communication devices, tracking devices, embedded wireless modules, and/or other wirelessly equipped communication devices (whether or not user operated), can operate. The access nodes 354 may be said to establish an access network 356. The access network 356 may be referred to as a radio access network (RAN) in some contexts. In a 5G technology generation an access node 354 may be referred to as a next Generation Node B (gNB). In 4G technology (e.g., long term evolution (LTE) technology) an access node 354 may be referred to as an evolved Node B (eNB). In 3G technology (e.g., code division multiple access (CDMA) and global system for mobile communication (GSM)) an access node 354 may be referred to as a base transceiver station (BTS) combined with a base station controller (BSC). In some contexts, the access node 354 may be referred to as a cell site or a cell tower. In some implementations, a picocell may provide some of the functionality of an access node 354, albeit with a constrained coverage area. Each of these different embodiments of an access node 354 may be considered to provide roughly similar functions in the different technology generations.

In an embodiment, the access network 356 comprises a first access node 354a, a second access node 354b, and a third access node 354c. It is understood that the access network 356 may include any number of access nodes 354. Further, each access node 354 could be coupled with a core network 358 that provides connectivity with various application servers 359 and/or a network 360. In an embodiment, at least some of the application servers 359 may be located close to the network edge (e.g., geographically close to the UE 352 and the end user) to deliver so-called "edge computing." The network 360 may be one or more private networks, one or more public networks, or a combination thereof. The network 360 may comprise the public switched telephone network (PSTN). The network 360 may comprise the Internet. With this arrangement, a UE 352 within coverage of the access network 356 could engage in air-interface communication with an access node 354 and could thereby communicate via the access node 354 with various application servers and other entities.

The communication system 350 could operate in accordance with a particular radio access technology (RAT), with communications from an access node 354 to UEs 352 defining a downlink or forward link and communications from the UEs 352 to the access node 354 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 354 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 354 could define an air interface configured in a specific manner to define physical resources for carrying information wirelessly between the access node 354 and UEs 352.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 352.

In addition, certain resource elements on the example air interface could be reserved for special purposes. For instance, on the downlink, certain resource elements could be reserved to carry synchronization signals that UEs 352 could detect as an indication of the presence of coverage and to establish frame timing, other resource elements could be reserved to carry a reference signal that UEs 352 could measure in order to determine coverage strength, and still other resource elements could be reserved to carry other control signaling such as PRB-scheduling directives and acknowledgement messaging from the access node 354 to served UEs 352. And on the uplink, certain resource elements could be reserved to carry random access signaling from UEs 352 to the access node 354, and other resource elements could be reserved to carry other control signaling such as PRB-scheduling requests and acknowledgement signaling from UEs 352 to the access node 354.

The access node 354, in some instances, may be split functionally into a radio unit (RU), a distributed unit (DU), and a central unit (CU) where each of the RU, DU, and CU have distinctive roles to play in the access network 356. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
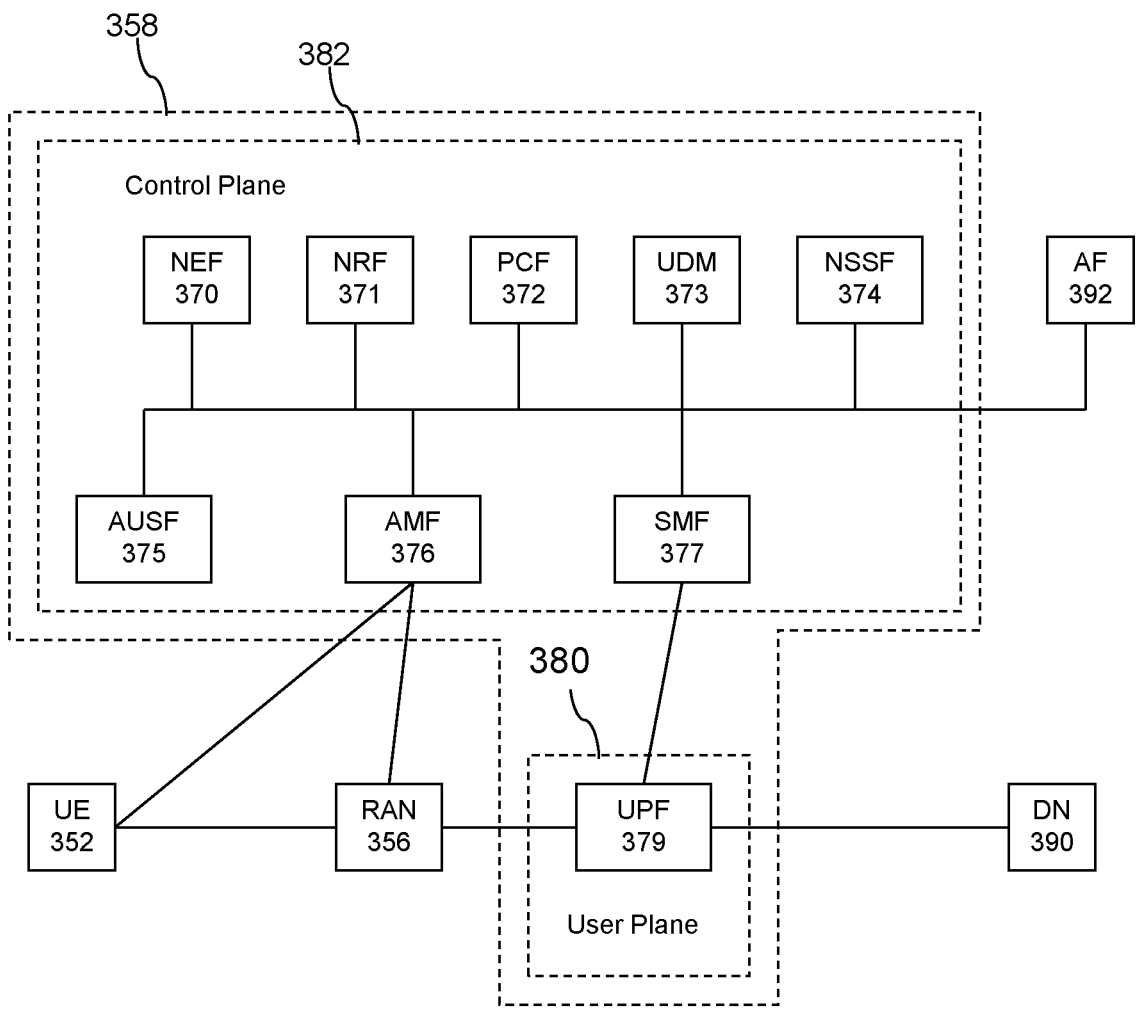
FIG. 6B is a block diagram of a core network of the communication system of FIG. 6A according to an embodiment of the disclosure.

Turning now to FIG. 6B, further details of the core network 358 are described. In an embodiment, the core network 358 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 379, an authentication server function (AUSF) 375, an access and mobility management function (AMF) 376, a session management function (SMF) 377, a network exposure function (NEF) 370, a network repository function (NRF) 371, a policy control function (PCF) 372, a unified data management (UDM) 373, a network slice selection function (NSSF) 374, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 358 may be segregated into a user plane 380 and a control plane 382, thereby promoting independent scalability, evolution, and flexible deployment.

The UPF 379 delivers packet processing and links the UE 352, via the access network 356, to a data network 390 (e.g., the network 360 illustrated in FIG. 6A). The AMF 376 handles registration and connection management of non-access stratum (NAS) signaling with the UE 352. Said in other words, the AMF 376 manages UE registration and mobility issues. The AMF 376 manages reachability of the UEs 352 as well as various security issues. The SMF 377 handles session management issues. Specifically, the SMF 377 creates, updates, and removes (destroys) protocol data unit (PDU) sessions and manages the session context within the UPF 379. The SMF 377 decouples other control plane functions from user plane functions by performing dynamic host configuration protocol (DHCP) functions and IP address management functions. The AUSF 375 facilitates security processes.

The NEF 370 securely exposes the services and capabilities provided by network functions. The NRF 371 supports service registration by network functions and discovery of network functions by other network functions. The PCF 372 supports policy control decisions and flow based charging control. The UDM 373 manages network user data and can be paired with a user data repository (UDR) that stores user data such as customer profile information, customer authentication number, and encryption keys for the information. An application function 392, which may be located outside of the core network 358, exposes the application layer for interacting with the core network 358. In an embodiment, the application function 392 may be executed on an application server 359 located geographically proximate to the UE 352 in an "edge computing" deployment mode. The core network 358 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 374 can help the AMF 376 to select the network slice instance (NSI) for use with the UE 352.

Figure 7:
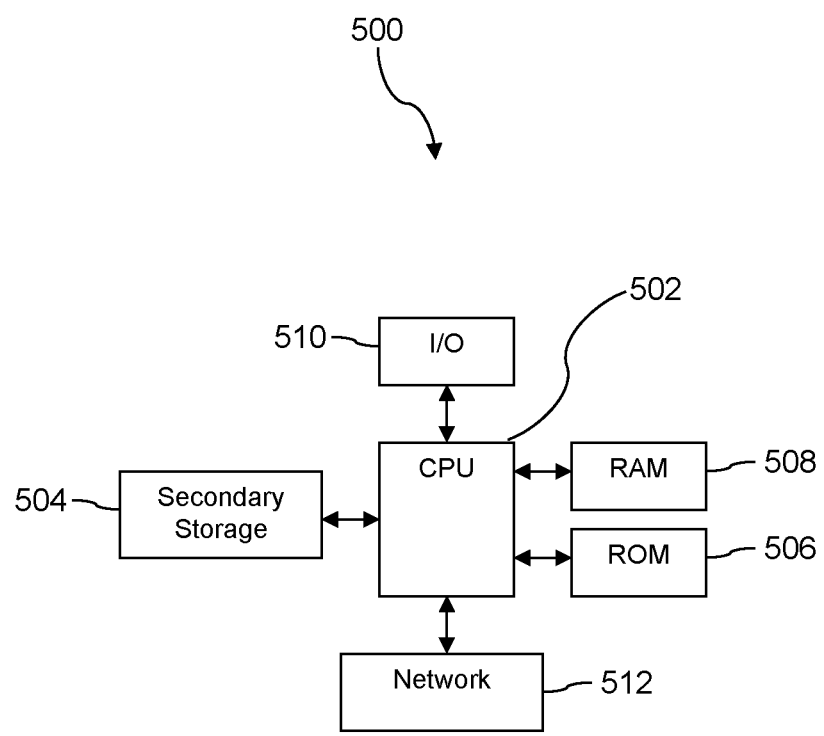
FIG. 7 is a block diagram of a computer system according to an embodiment of the disclosure.

FIG. 7 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for testing a computer system, the method comprising:
    executing by a testing tool of a testing system computer executable instructions defining a test batch comprising a plurality of separate test cases, wherein each test case of the plurality of test cases defines a sequence of processing actions to be executed on the computer system and an expected result;
    generating a plurality of test logs by a plurality of components of the computer system in response to the execution of the test batch by the testing tool;
    identifying automatically by a testing dashboard of the testing system a subset of test logs of the plurality of test logs associated with a failed test case of the plurality of test cases prior to the conclusion of the execution of the test batch by the testing tool;
    sorting automatically by the testing dashboard the subset of test logs into a specific arrangement prior to the conclusion of the execution of the test batch by the testing tool;
    training a failure analysis module of the testing dashboard using specific training data;
    subsequent to the training, determining automatically by the failure analysis module of the testing dashboard a root cause of the failure of the failed test case based on the arrangement of the sorted subset of test logs whereby the failure analysis module determines a failure category of the failed test case, wherein the determined root cause comprises one or more of a hardware failure associated with specific hardware of the computer system, a software associated with specific software code executed on the computer system, a data failure associated with specific data utilized by software code executed on the computer system, a failure associated with the operating environment, or a failure associated with a code fix or repair; and
    reducing processing resources consumed by the testing system by aborting by the testing dashboard, prior to completion of the test batch, the execution of the computer executable instructions defining the test batch responsive to the determination of the root cause of the failure of the failed test case by the failure analysis module, wherein the aborting comprises aborting any subsequent test cases of the test batch that follow the failed test case based on the determined root cause of the failed test case.

2. The method of claim 1, wherein aborting by the testing dashboard the execution of the test batch comprises releasing processing resources of the computer system dedicated to the execution of the test batch for use by other processes of the computer system prior to the conclusion of the execution of the test batch.

3. The method of claim 1, further comprising:
    modifying the failure analysis module of the testing dashboard based on a performance score of the failure analysis module associated with the determination of the root cause of the failure of the failed test case.

4. The method of claim 3, wherein modifying the failure analysis module comprises updating an algorithm of the failure analysis module based on the performance score of the failure analysis module associated with the determination of the root cause of the failure of the failed test case.

5. The method of claim 1, wherein determining automatically by the failure analysis module of the testing dashboard the root cause of the failure of the failed test case comprises determining the failure category of the failed test case and identifying a component of the plurality of components at which the failure of the failed test case occurred.

6. The method of claim 1, wherein sorting automatically by the testing dashboard the subset of test logs into the specific arrangement comprises constructing automatically by the testing dashboard a sequential timeline arranging the subset of test logs into a temporally ordered sequence prior to the conclusion of the execution of the test batch by the testing tool.

7. A method for testing a computer system, the method comprising:

executing by a testing tool of a testing system computer executable instructions defining a test batch comprising a plurality of separate test cases, wherein each test case of the plurality of test cases defines a sequence of processing actions to be executed on the computer system and an expected result;

generating a plurality of test logs by a plurality of components of the computer system in response to the execution of the test batch by the testing tool;

identifying automatically by a testing dashboard of the testing system a subset of test logs of the plurality of test logs associated with a failed test case of the plurality of test cases prior to the conclusion of the execution of the test batch by the testing tool;

constructing automatically by the testing dashboard a sequential timeline arranging the subset of test logs into a temporally ordered sequence prior to the conclusion of the execution of the test batch by the testing tool;

training a failure analysis module of the testing dashboard using specific training data;

subsequent to the training, determining automatically by the failure analysis module of the testing dashboard a root cause of the failure of the failed test case based on the timeline arranging the subset of test logs, wherein the root cause comprises one or more of a hardware failure associated with specific hardware of the computer system, a software associated with specific software code executed on the computer system, a data failure associated with specific data utilized by software code executed on the computer system, a failure associated with the operating environment, or a failure associated with a code fix or repair; and reducing processing resources consumed by the testing system by aborting by the testing dashboard, prior to completion of the test batch, the execution of the computer executable instructions defining the test batch responsive to the determination of the root cause of the failure of the failed test case by the failure analysis module, wherein the aborting comprises aborting any subsequent test cases of the test batch that follow the failed test case based on the determined root cause of the failed test case.

8. The method of claim 7, wherein each individual test log of the subset of test logs contained in the sequential timeline has a timestamp that precedes in time the timestamps of each of the test logs of the subset of test logs arranged ahead of the individual test log.

9. The method of claim 7, further comprising:
indicating by a user interface of the testing dashboard the timeline to a user of the testing system.

10. The method of claim 7, further comprising:
modifying the failure analysis module of the testing dashboard based on a performance score of the failure analysis module associated with the determination of the root cause of the failure of the failed test case.

11. The method of claim 7, wherein determining automatically by the failure analysis module of the testing dashboard the root cause of the failure of the failed test case comprises at least one of determining a failure category of the failed test case and identifying a component of the plurality of components at which the failure of the failed test case occurred.

12. A system for testing a computer system, the system comprising:
a testing computer system comprising:
a testing tool configured to:
execute executable instructions defining a test batch comprising a plurality of separate test cases, wherein each test case of the plurality of test cases defines a sequence of processing actions to be executed on the computer system and an expected result, wherein a plurality of test logs are generated by a plurality of components of the computer system in response to the execution of the test batch by the testing tool; and a testing dashboard comprising a failure analysis module trained using specific training data, the testing dashboard configured to:
identify automatically a subset of test logs of the plurality of test logs associated with a failed test case of the plurality of test cases prior to the conclusion of the execution of the test batch by the testing tool, sort automatically the subset of test logs into a specific arrangement prior to the conclusion of the execution of the test batch by the testing tool, subsequent to the failure analysis module being trained, determine automatically by the failure analysis module a root cause of the failure of the failed test case based on the arrangement of the sorted subset of test logs whereby the failure analysis module determines a failure category of the failed test case, wherein the root cause comprises one or more of a hardware failure associated with specific hardware of the computer system, a software associated with specific software code executed on the computer system, a data failure associated with specific data utilized by software code executed on the computer system, a failure associated with the operating environment, or a failure associated with a code fix or repair, and reduce processing resources consumed by the testing system by aborting, prior to completion of the test batch, the execution of the computer executable instructions defining the test batch responsive to the determination of the root cause of the failure of the failed test case by the failure analysis module, wherein the aborting comprises aborting any subsequent test cases of the test batch that follow the failed test case based on the determined root cause of the failed test case.

13. The system of claim 12, wherein determining automatically the root cause of the failure of the failed test case comprises identifying a component of the plurality of components at which the failure of the failed test case occurred.

14. The system of claim 12, wherein the failure category of the failed test case comprises one of a hardware failure of at least one of the plurality of components, a software failure associated with software executed by at least one of the plurality of components, and a data error associated with data processed by at least one of the plurality of components.

15. The system of claim 14, wherein the failure category of the failed test case is a hardware failure, and wherein the failure analysis module identifies the component of the plurality of the components associated with the hardware failure.

16. The system of claim 12, wherein the failure analysis module determines in near real-time the failure of the failed test case based on the arrangement of the sorted subset of test logs whereby the failure analysis module determines a failure category of the failed test case.

17. The system of claim 12, wherein sorting automatically the subset of test logs into the specific arrangement comprises constructing automatically by the testing dashboard a sequential timeline arranging the subset of test logs into a temporally ordered sequence prior to the conclusion of the execution of the test batch by the testing tool.

* * * * *